(12) United States Patent
Dhuse et al.

(10) Patent No.: US 10,678,619 B2
(45) Date of Patent: Jun. 9, 2020

(54) UNIFIED LOGS AND DEVICE STATISTICS

(71) Applicant: International Business Machines Corporation, Armonk, NY (US)

(72) Inventors: Greg R. Dhuse, Chicago, IL (US); Yogesh R. Vedpathak, Chicago, IL (US)

(73) Assignee: Pure Storage, Inc., Mountain View, CA (US)

( * ) Notice: Subject to any disclaimer, the term of this patent is extended or adjusted under 35 U.S.C. 154(b) by 135 days.

(21) Appl. No.: 15/716,169

(22) Filed: Sep. 26, 2017

(65) Prior Publication Data
US 2018/0018210 A1    Jan. 18, 2018

Related U.S. Application Data

(63) Continuation-in-part of application No. 13/547,769, filed on Jul. 12, 2012, now Pat. No. 9,852,017.
(Continued)

(51) Int. Cl.
*G06F 11/07* (2006.01)
*G06F 11/10* (2006.01)
(Continued)

(52) U.S. Cl.
CPC ........ *G06F 11/0727* (2013.01); *G06F 11/079* (2013.01); *G06F 11/0769* (2013.01);
(Continued)

(58) Field of Classification Search
CPC ............. G06F 11/0727; G06F 11/0778; G06F 11/3006; G06F 11/3034
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

FOREIGN PATENT DOCUMENTS

WO    2011030164 A1    3/2011

OTHER PUBLICATIONS

Agrawal, Nitin, et al. "A five-year study of file-system metadata." ACM Transactions on Storage (TOS) 3.3 (2007): 9.
(Continued)

*Primary Examiner* — Joseph R Kudirka
(74) *Attorney, Agent, or Firm* — Garlick & Markison; Timothy W. Markison; Kelly H. Hale

(57) ABSTRACT

A computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations. The computing device detects a state change within the DSN based on at least one signal received via an interface. The computing device obtains a state descriptor, a timestamp, and state parameters. The computing device then generates a log record entry based on aggregation of the state change, the state descriptor, the timestamp, and/or the state parameters. The computing device then facilitates storage of the log record entry within event memory of the DSN.

20 Claims, 8 Drawing Sheets

Related U.S. Application Data

(60) Provisional application No. 61/512,122, filed on Jul. 27, 2011.

(51) Int. Cl.
*G06F 11/30* (2006.01)
*G06F 11/34* (2006.01)
*G06F 11/32* (2006.01)

(52) U.S. Cl.
CPC ...... *G06F 11/0778* (2013.01); *G06F 11/1076* (2013.01); *G06F 11/3006* (2013.01); *G06F 11/3034* (2013.01); *G06F 11/3072* (2013.01); *G06F 11/3086* (2013.01); *G06F 11/3419* (2013.01); *G06F 11/3476* (2013.01); *G06F 11/1092* (2013.01); *G06F 11/321* (2013.01); *G06F 11/3485* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,794,252 A | 8/1998 | Bailey et al. |
| 5,802,364 A | 9/1998 | Senator et al. |
| 5,809,285 A | 9/1998 | Hilland |
| 5,890,156 A | 3/1999 | Rekieta et al. |
| 5,948,110 A | 9/1999 | Hitz et al. |
| 5,987,622 A | 11/1999 | Lo Verso et al. |
| 5,991,414 A | 11/1999 | Garay et al. |
| 6,012,159 A | 1/2000 | Fischer et al. |
| 6,047,353 A | 4/2000 | Vishlitzky et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,330,997 B1 | 2/2008 | Odom |
| 7,516,209 B2 | 4/2009 | Raghuraman et al. |
| 7,627,617 B2 | 12/2009 | Kavuri et al. |
| 7,636,724 B2 | 12/2009 | de la Torre et al. |
| 7,681,105 B1 | 3/2010 | Sim-Tang et al. |
| 7,685,269 B1 | 3/2010 | Thrasher et al. |
| 7,739,546 B1 * | 6/2010 | Rodrigues ........... G06F 11/1662 714/13 |
| 8,024,712 B1 | 9/2011 | Korolev et al. |
| 8,516,343 B2 | 8/2013 | Flynn et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2004/0243699 A1 | 12/2004 | Koclanes et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2005/0278476 A1 | 12/2005 | Teske et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0161805 A1 | 7/2006 | Tseng et al. |
| 2006/0224603 A1 | 10/2006 | Correll |
| 2006/0236053 A1 | 10/2006 | Shiga et al. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0083724 A1 | 4/2007 | Kitamura |
| 2007/0088970 A1 | 4/2007 | Buxton et al. |
| 2007/0174192 A1 | 7/2007 | Gladwin et al. |
| 2007/0192478 A1 | 8/2007 | Louie et al. |
| 2007/0214285 A1 | 9/2007 | Au et al. |
| 2007/0234110 A1 | 10/2007 | Soran et al. |
| 2007/0245248 A1 * | 10/2007 | Christiansen ..... H04L 29/06027 715/753 |
| 2007/0283167 A1 | 12/2007 | Venters et al. |
| 2007/0294565 A1 | 12/2007 | Johnston et al. |
| 2008/0162592 A1 | 7/2008 | Huang et al. |
| 2009/0094245 A1 | 4/2009 | Kerns |
| 2009/0094250 A1 * | 4/2009 | Dhuse ................ G06F 11/1004 |
| 2009/0094251 A1 | 4/2009 | Gladwin et al. |
| 2009/0094318 A1 | 4/2009 | Gladwin et al. |
| 2009/0106602 A1 * | 4/2009 | Piszczek ............... G06F 11/008 714/42 |
| 2009/0164979 A1 | 6/2009 | Fischer |
| 2009/0276566 A1 | 11/2009 | Coatney et al. |
| 2010/0023524 A1 | 1/2010 | Gladwin et al. |
| 2010/0058313 A1 | 3/2010 | Hansmann et al. |
| 2010/0229112 A1 | 9/2010 | Ergan et al. |
| 2010/0332818 A1 | 12/2010 | Prahlad et al. |
| 2011/0026842 A1 | 2/2011 | Cilfone et al. |
| 2011/0071988 A1 * | 3/2011 | Resch ................ G06F 11/1076 707/691 |
| 2011/0107103 A1 | 5/2011 | Dehaan et al. |
| 2011/0161680 A1 | 6/2011 | Grube et al. |
| 2012/0047214 A1 | 2/2012 | Daly et al. |
| 2012/0266011 A1 | 10/2012 | Storer et al. |
| 2013/0097367 A1 | 4/2013 | Flynn et al. |

OTHER PUBLICATIONS

Chung; An Automatic Data Segmentation Method for 3D Measured Data Points; National Taiwan University; pp. 1-8; 1998.

Douglis, Fred, and John Ousterhout. "Log-structured file system." COMPCON Spring'89. Thirty-Fourth IEEE Computer Society International Conference: Intellectual Leverage, Digest of Papers. IEEE, 1989.

European Patent Office; Extended Search Report; EP Application No. 12817413.3; dated Feb. 24, 2015; 6 pgs.

Harrison; Lightweight Directory Access Protocol (LDAP): Authentication Methods and Security Mechanisms; IETF Network Working Group; RFC 4513; Jun. 2006; pp. 1-32.

International Search Report and Written Opinion; International Application No. PCT/US12/46544; dated Oct. 16, 2012; 7 pgs.

(56) References Cited

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
Legg; Lightweight Directory Access Protocol (LDAP): Syntaxes and Matching Rules; IETF Network Working Group; RFC 4517; Jun. 2006; pp. 1-50.
"Muhammad, Yousaf, ""Evaluation and Implementation of Distributed NoSQL Database for MMO Gaming Environment,"" Oct. 2011, http://www.diva-portal.org/smash/get/diva2:44721 0/FULL TEXT01.pdf".
Plank, T1: Erasure Codes for Storage Applications; FAST2005, 4th Usenix Conference on File Storage Technologies; Dec. 13-16, 2005; pp. 1-74.
Rabin; Efficient Dispersal of Information for Security, Load Balancing, and Fault Tolerance; Journal of the Association for Computer Machinery; vol. 36, No. 2; Apr. 1989; pp. 335-348.
"Resch, Jason K, Plank, James S., ""AONT-RS: Blending Security and Performance in Dispersed Storage Systems;"" Feb. 2011, http://web.eecs.utk.edu/-plank!plank!papers/FAST-2011.pdf".
Satran, et al.; Internet Small Computer Systems Interface (iSCSI); IETF Network Working Group; RFC 3720; Apr. 2004; pp. 1-257.
Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group; RFC 1511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): String Representation of Search Filters; IETF Network Working Group; RFC 4515; Jun. 2006; pp. 1-12.
Smith; Lightweight Directory Access Protocol (LDAP): Uniform Resource Locator; IETF Network Working Group; RFC 4516; Jun. 2006; pp. 1-15.
Tate, Jon, et al. Introduction to storage area networks. IBM Corporation, International Technical Support Organization, 2005.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner

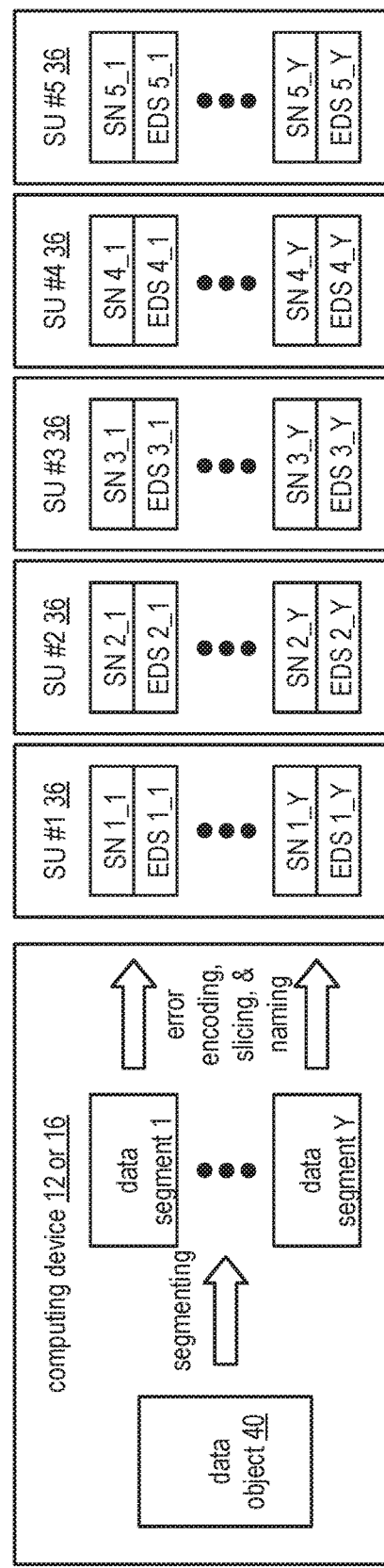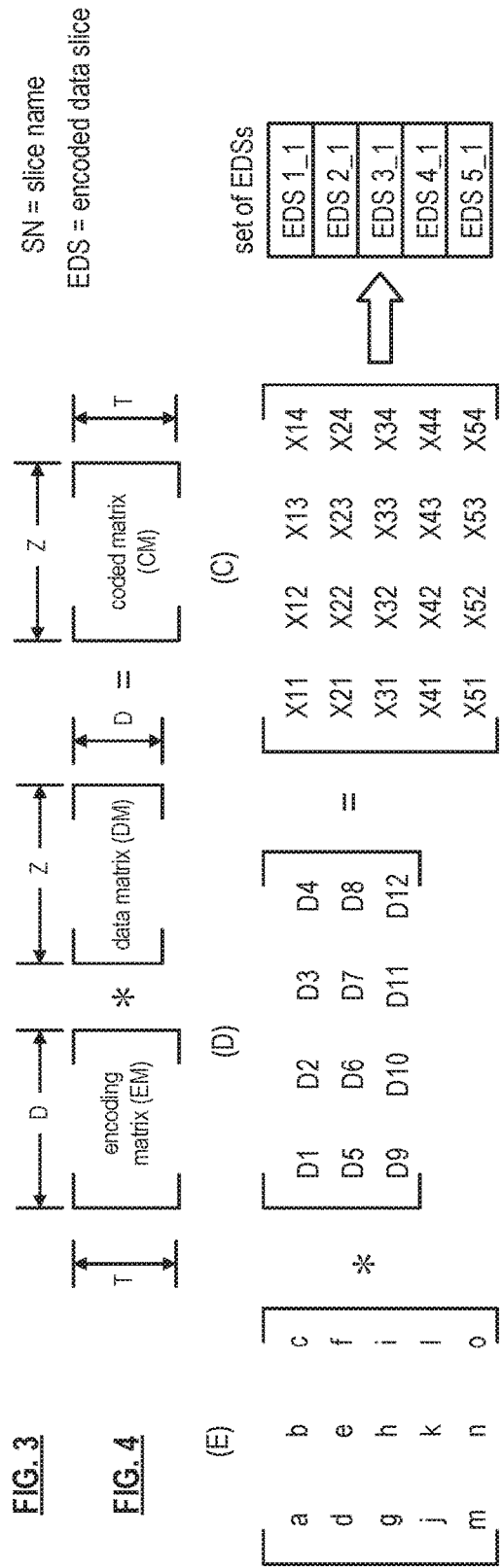

1001 event record

| step | reporting entity ID | timestamp | event ID | sequence no. | parent event ID | msg source | other |
|---|---|---|---|---|---|---|---|
| recv request | | 15:03:49.354 | | 302 | | user device 457 | --- |
| process | | 15:03:50.793 | | --- | | --- | --- |
| send response | | 15:03:51.485 | | 302 | | --- | --- |

FIG. 10A

1002 log record

| state | reporting entity ID | timestamp | state descriptor | state parameters |
|---|---|---|---|---|
| 1A | | 15:03:49.354 | request received | slice name 2F5 |
| 2B | | 15:03:50.793 | request processed | slice size 1k bytes |
| 3A | | 15:03:51.485 | response sent | seq no. 302 |

FIG. 10B

1003 statistics record

| step | reporting entity ID | timestamp | quantified descriptor 1 | | ••• | quantified descriptor Q | |
|---|---|---|---|---|---|---|---|
| | | | type | value | | type | value |
| recv request | | 15:03:49.354 | errors | 0 | | rate | 15Mbps |
| process | | 15:03:50.793 | loading | 35% | | cache | 2GB |
| send response | | 15:03:51.485 | queue | 10% | | bandwidth | 10Mbps |

FIG. 10C

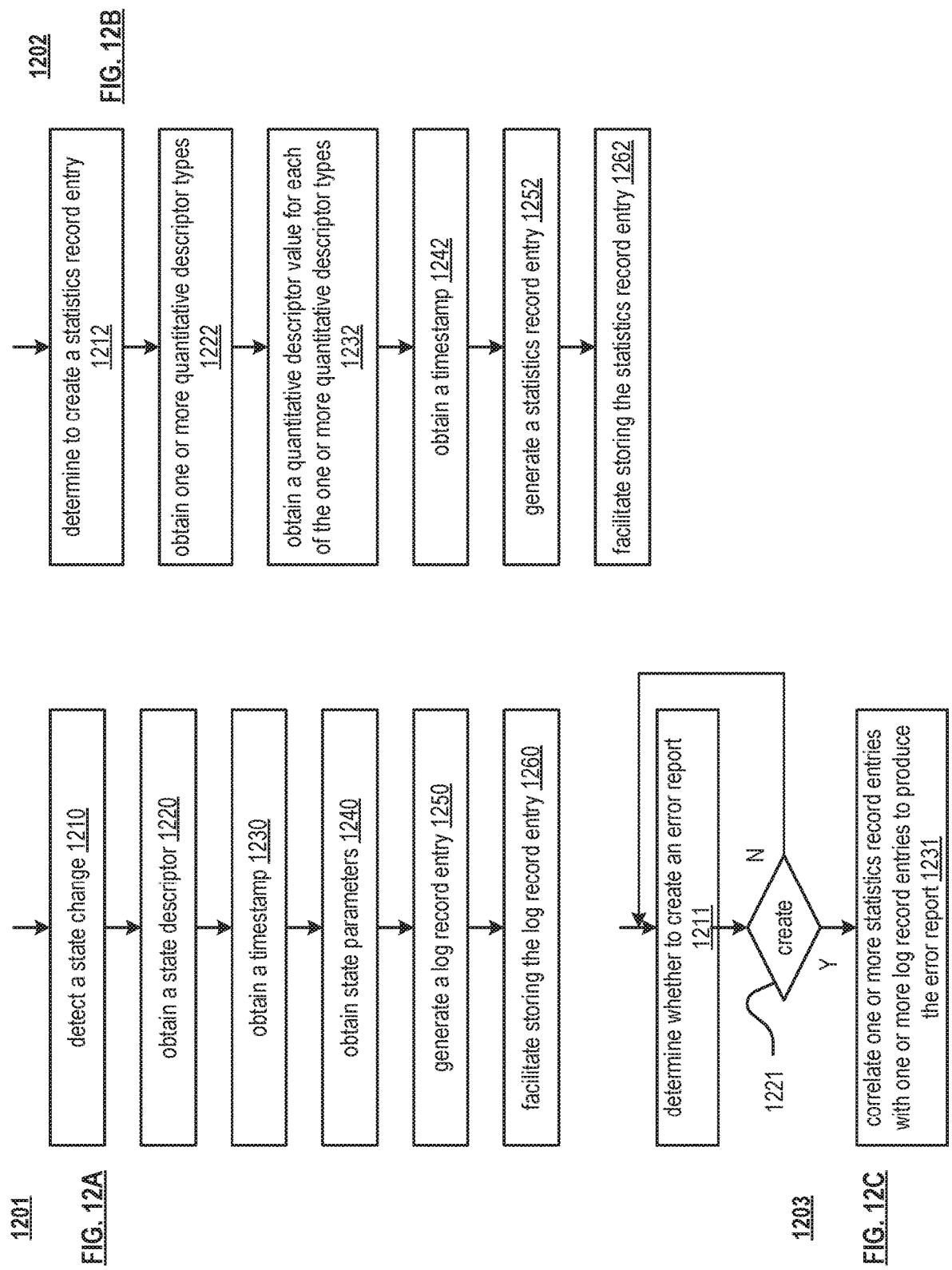

UNIFIED LOGS AND DEVICE STATISTICS

CROSS REFERENCE TO RELATED PATENTS

The present U.S. Utility Patent Application claims priority pursuant to 35 U.S.C. § 120, as a continuation-in-part (CIP) of U.S. Utility patent application Ser. No. 13/547,769, entitled "GENERATING DISPERSED STORAGE NETWORK EVENT RECORDS, filed Jul. 12, 2012, which claims priority pursuant to 35 U.S.C. § 119(e) to U.S. Provisional Application No. 61/512,122, entitled "PROCESSING EVENT INFORMATION IN A DISPERSED STORAGE NETWORK," filed Jul. 27, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems do not provide adequate means by which analysis of the system's operation may be made. For example, in prior art data storage systems, when there may be a failure of one or more components therein, the prior art does not include capability effectively to determine the source and/or cause of such a failure absent in an acceptable manner.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10A is a diagram illustrating an example of an event record in accordance with the invention;

FIG. 10B is a diagram illustrating an example of a log record in accordance with the invention;

FIG. 10C is a diagram illustrating an example of a statistics record in accordance with the invention;

FIG. 12A is a flowchart illustrating an example of generating a log record in accordance with the invention;

FIG. 12B is a flowchart illustrating an example of generating a statistics record in accordance with the invention; and FIG. 12C is a flowchart illustrating an example of correlating a statistics record and a log record in accordance with the invention.

DETAILED DESCRIPTION OF THE INVENTION

Figure 1:
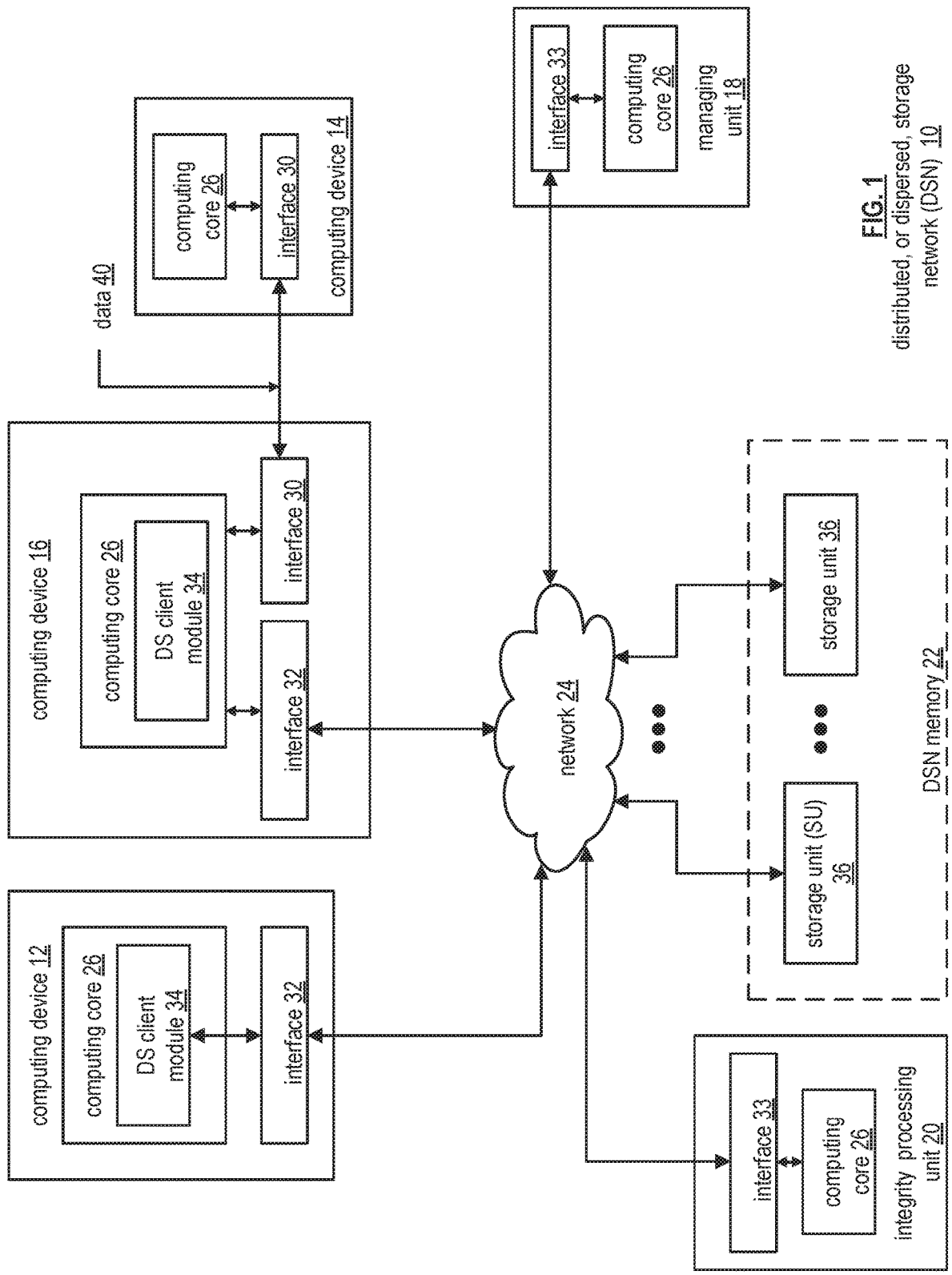
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
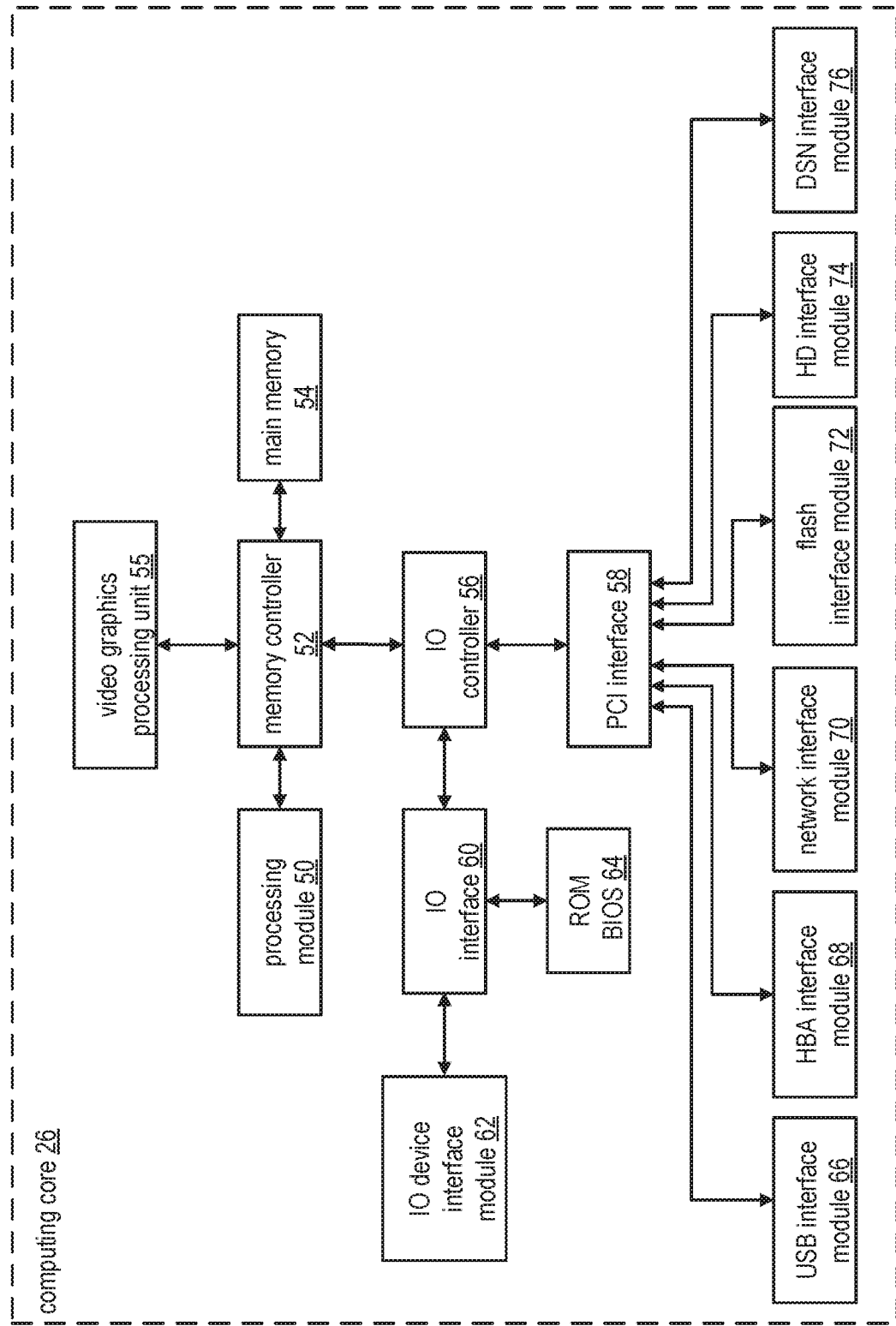
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
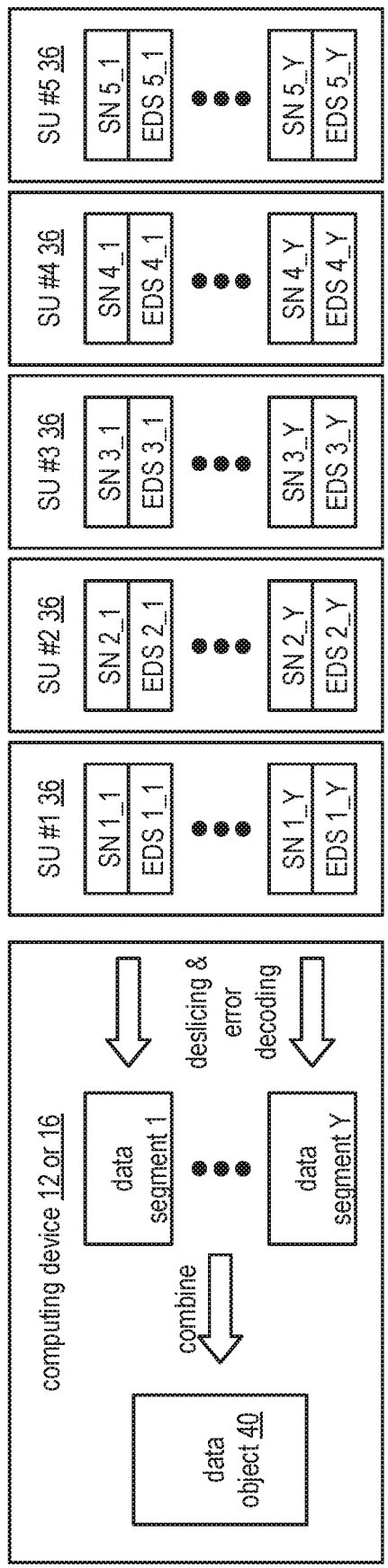
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
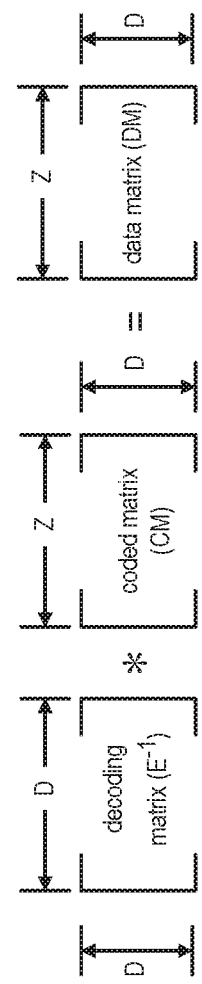
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
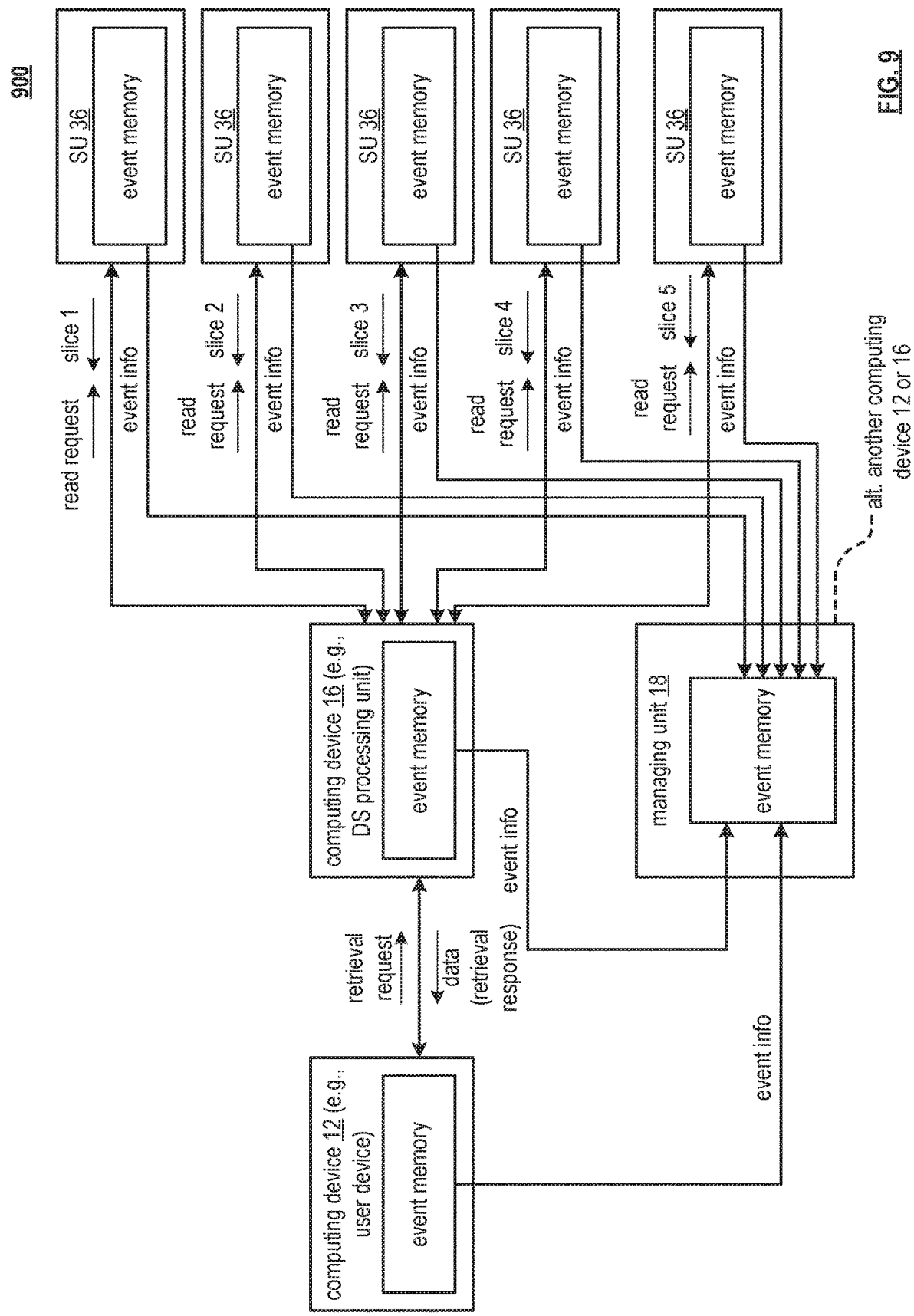
FIG. 9 is a schematic block diagram of another embodiment of a computing system in accordance with the invention.

FIG. 9 is a schematic block diagram 900 of another embodiment of a computing system in accordance with the invention. This diagram is a schematic block diagram of another embodiment of a computing system that includes a computing device 12 (e.g., a user device), a computing device 16 (e.g., a dispersed storage (DS) processing unit), a managing unit 18, and a plurality of storage units (SUs) 36. Each of the computing device 12, the computing device 16, the managing unit 18, and the plurality of SUs 36 may include an event memory. The event memory may be implemented as a single memory device, a plurality of memory devices, and/or embedded circuitry of a processing module. Such a memory device may be a read-only memory, random access memory, volatile memory, non-volatile memory, static memory, dynamic memory, flash memory, cache memory, magnetic disk memory, optical disk memory, and/or any device that stores digital information. The event memory stores event information including event records, log records, and statistics records.

Each of the user computing device 12, the computing device 16, the managing unit 18, and the plurality of SUs 36 store and/or retrieve event information from any one or more of the event memories of the system. Such event information may be subsequently utilized to document operation of the computing system. Any element of the system may receive event information from other elements of the system, aggregate the received event information, analyze the aggregated event information, and produce an analysis. For example, the computing device 12, the computing device 16, and the plurality of SUs 36 process transactions of the computing system, generate event information, store the event information in an associated event memory, and send the event information to the managing unit 18 for aggregation and analysis. The event records, log records, and statistics records are discussed in greater detail with reference to FIGS. 10A-10C.

In an example of operation, computing device 12 sends a retrieval request to the computing device 16, generates retrieval request event information, and stores the retrieval request event information in the event memory of the computing device 12. The computing device 16 receives the retrieval request, generates received retrieval request event information, and stores the received retrieval request event information in the event memory of the computing device 16. The computing device 16 processes the retrieval request to generate a plurality of read requests, generates read request processing event information (e.g., for each request), and stores the read request processing event information in the event memory of the computing device 16. The computing device 16 sends the plurality of read requests to the plurality of SUs 36, generates read request sending event information (e.g., for each request), and stores the read request sending event information in the event memory of the computing device 16. Each SU 36 of the plurality of SUs 36 receives a read request of the plurality of read requests, generates received read request event information, and stores the received read request event information in the event memory of the SU 36. The SU 36 processes the read request to retrieve a slice, generates slice retrieval processing event information, and stores the slice retrieval processing event information in the event memory of the SU 36. The SU 36 sends a read response that includes the retrieved slice to computing device 16, generates read response event information, and stores the read response event information in the event memory of the SU 36.

In the example of operation continued, the computing device 16 receives a read response from each SU 36 of the plurality of SUs 36 to produce a plurality of slices 1-5. The computing device 16 generates received read response event information corresponding to each of the received slices 1-5 and stores the read response event information in the event memory of the computing device 16. The computing device 16 processes the received slices 1-5 decoding the slices 1-5 to reproduce data. The computing device 16 generates decoding event information and stores the decoding event information in the event memory of the computing device 16. The computing device 16 sends a retrieval response that includes the data to the computing device 12, generates retrieval response event information, and stores the retrieval response event information in the event memory of the computing device 16. The computing device 12 receives the retrieval response, generates received data event information, and stores the received data event information in the event memory.

In the example of operation continued, each of the computing device 12, the computing device 16, and the plurality of SUs 36 send event information to the managing unit 18. The managing unit 18 stores event information in the event memory of the managing unit 18. The managing unit 18 receives an analysis query from a requesting entity, retrieves event information from the event memory of managing unit 18, aggregates the event information, analyzes the event information in accordance with the analysis query to produce an analysis, generates a representation of the analysis, and sends the representation to the requesting entity.

In an example of operation and implementation, a computing device (e.g., computing device 12, computing device 16, managing unit 18, a SU 36 of the set of SUs, etc.) includes an interface configured to interface and communicate with a dispersed or distributed storage network (DSN), a memory that stores operational instructions, and a processing module operably coupled to the interface and memory such that the processing module, when operable within the computing device based on the operational instructions, is configured to perform various operations. The processing module, when operable within the computing device based on the operational instructions, is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, the computing device is configured to detect a state change within the DSN based on at least one signal received via the interface. Note that a data object is segmented into a plurality of data segments, and a data segment of the plurality of data segments is dispersed error encoded in accordance with dispersed error encoding parameters to produce a set of encoded data slices (EDSs) that are distributedly stored in a plurality of SUs within the DSN. The computing device is also configured to obtain a state descriptor and to obtain a timestamp. The computing device is also configured to obtain state parameters. Then, the computing device is also configured to generate a log record entry based on aggregation of the state change, the state descriptor, the timestamp, and/or the state parameters. The computing device is also configured to facilitate storage of the log record entry within event memory of the DSN.

In some examples, note that the detection of the state change is based on a software flag, a message, a predetermination, a process output, a pattern match, a valid state table, and/or a previous state condition. In some other examples, the obtaining the state descriptor is based on the state change, lookup, generating a state descriptor, a state descriptor table lookup, retrieving the state descriptor, and/or receiving the state descriptor in response to sending a query. In even other examples, the obtaining the timestamp is based on querying a time module, receiving the timestamp, and/or retrieving the timestamp. In some other examples, obtaining the state parameters is based on the state change, the state descriptor, the timestamp, a state parameters table lookup, retrieving state parameters, an error message, a parameter table lookup, a parameter history record lookup, and/or receiving a state parameter in response to sending the query or another query. Also, in some particular examples, facilitating the storage of the log record entry within event memory of the DSN is based on storing the log record entry within locally within the memory and/or transmitting the log record entry to another computing device within the DSN.

In some examples of operation and implementation, the computing device is also configured to determine to generate a statistics record. The computing device is also configured to obtain one or more quantitative descriptor types and obtain a quantitative descriptor value for each of the one or more quantitative descriptor types. The computing device is also configured to obtain the timestamp described above (and/or another timestamp) and to generate a statistics record entry. In some examples, the computing device is configured to generate a statistics record entry including to generate one or more entries of fields of the statistics record entry including a reporting entity identifier (ID), a step of a process and/or event, the timestamp(s), the one or more quantitative descriptor types, and/or one or more quantitative descriptor values corresponding to each of the one more quantitative descriptor types. Then, the computing device is also configured to facilitate storage of the statistics record entry within event memory of the DSN.

In some particular examples, determination to generate the statistics record is based on an error message, a state change, a time period, an event, a software flag, a message, a predetermination, a process output, a pattern match, a previous state condition, a previous statistic, a statistical correlation output, a request, or receipt of a slice storage error message. Also, in other examples, obtaining the one or more descriptor types is based a lookup, a system condition, configuration information, a retrieval, a query, receiving, an error message, and/or a memory utilization indicator. Note also that, in certain other examples, obtaining the quantitative descriptor value for each of the one or more quantitative descriptor types is based on query, receiving, an error message, a historical record lookup, another statistics record entry, and/or a value source indicator table lookup.

In some examples, with respect to a data object, the data object is segmented into a plurality of data segments, and a data segment of the plurality of data segments is dispersed error encoded in accordance with dispersed error encoding parameters to produce a set of encoded data slices (EDSs). In some examples, the set of EDSs is of pillar width. Also, with respect to certain implementations, note that the decode threshold number of EDSs are needed to recover the data segment, and a read threshold number of EDSs provides for reconstruction of the data segment. Also, a write threshold number of EDSs provides for a successful transfer of the set of EDSs from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some particular examples, the write threshold number is greater than or equal to the read threshold number that is greater than or equal to the decode threshold number.

Note that the computing device as described herein may be located at a first premises that is remotely located from a second premises associated with at least one other computing device, at least one SU of a plurality of SUs within the DSN (e.g., such as a plurality of SUs that are implemented to store distributedly the set of EDSs), etc. In addition, note that such a computing device as described herein may be implemented as any of a number of different devices including a managing unit that is remotely located from another computing device within the DSN and/or SU within the DSN, an integrity processing unit that is remotely located from another computing device and/or SU within the DSN, and/or other device. Also, note that such a computing device as described herein may be of any of a variety of types of devices as described herein and/or their equivalents including a SU including a SU of any group and/or set of SUs within the DSN, a wireless smart phone, a laptop, a tablet, a personal computers (PC), a work station, and/or a video game device. Also, note also that the DSN may be implemented to include or be based on any of a number of different types of communication systems including a wireless communication system, a wire lined communication system, a non-public intranet system, a public internet system, a local area network (LAN), and/or a wide area network (WAN).

FIG. 10A is a diagram illustrating an example 1001 of an event record in accordance with the invention. This is a diagram illustrating an example of an event record that includes a reporting entity identifier (ID) field, an event ID field, a parent event ID field, and a table including a step field, a timestamp field, a sequence number field, a message source field, and an other field. Such an event record may be associated with an event record ID. The reporting entity ID field includes a reporting entity ID entry signifying an entity generating the event record. For example, reporting entity ID field includes an entry of ID=2 when the reporting entity is SU 2. The event ID field includes an event ID entry signifying an ID of a common event subsequently utilized to correlate event information from two or more reporting entities. For example, SU 2 and user device 3 create an event record utilizing event ID=54 when SU 2 and user device 3 perform steps associated with a common transaction. The parent event ID field includes a parent event ID entry signifying an ID of an event that initialized the present event. For example, SU 4 receives a read request of event ID=20 and spawns a new event ID=21 to authenticate the read request. The SU 4 generates an event record for event ID=21 that includes a parent event ID=20. Newly spawned events may spawn even more children events resulting in multiple layers of events. Multiple layers of events are discussed in greater detail with reference to FIG. 11.

The step field includes a step entry describing a step of the event. For example, a received request step, a processing step, a send response step, an authentication step, etc. The timestamp field includes a timestamp entry associated with the step. The sequence number field includes a sequence number entry of a protocol message between two or more elements of the computing system. The message source field includes a message source entry identifier of a system element sending an associated message. The other field includes another entry for additional information associated with the step. Such another entry includes one or more of a slice name, a source name, a transaction number, a system element hardware ID, a software version number, a software pointer, a log record ID, and a statistics record ID.

FIG. 10B is a diagram illustrating an example 1002 of a log record in accordance with the invention. This is a diagram illustrating an example of a log record that includes a reporting entity identifier (ID) field and a table including a state field, a timestamp field, a state descriptor field, and a state parameters field. Such a log record may be associated with a log record ID. The state field includes a state entry signifying a state of one or more of a software process, an event, a system state, a transaction, and a sequence. The state descriptor field includes a state descriptor entry qualitatively describing an associated state. For example, request received, request process, response sent, authentication request, authentication approved, memory available, system error, etc. The state parameters field includes a state parameter entry signifying additional information associated with the associated state. For example, a slice name, a slice size indicator, a sequence number, a transaction number, a software line, a software breakpoint indicator, a message ID, a requester Internet protocol address, etc.

FIG. 10C is a diagram illustrating an example 1003 of a statistics record in accordance with the invention. This is a diagram illustrating an example of a statistics record that includes a reporting entity identifier (ID) field and a table including a step field, a timestamp field, and one or more quantified descriptor fields 1-Q. Each quantified descriptor field includes a type field and a value field. Such a statistics record may be associated with a statistics record ID. The type field includes a type entry describing an associate value type. For example, a number of errors, a loading factor, a bandwidth utilization factor, a memory utilization factor, a reliability indicator, and availability indicator, a queue depth indicator, a bandwidth indicator, a cache availability indicator, a data rate indicator, etc. The value field includes a quantitative value entry of the associated type of quantified descriptor.

Figure 11:
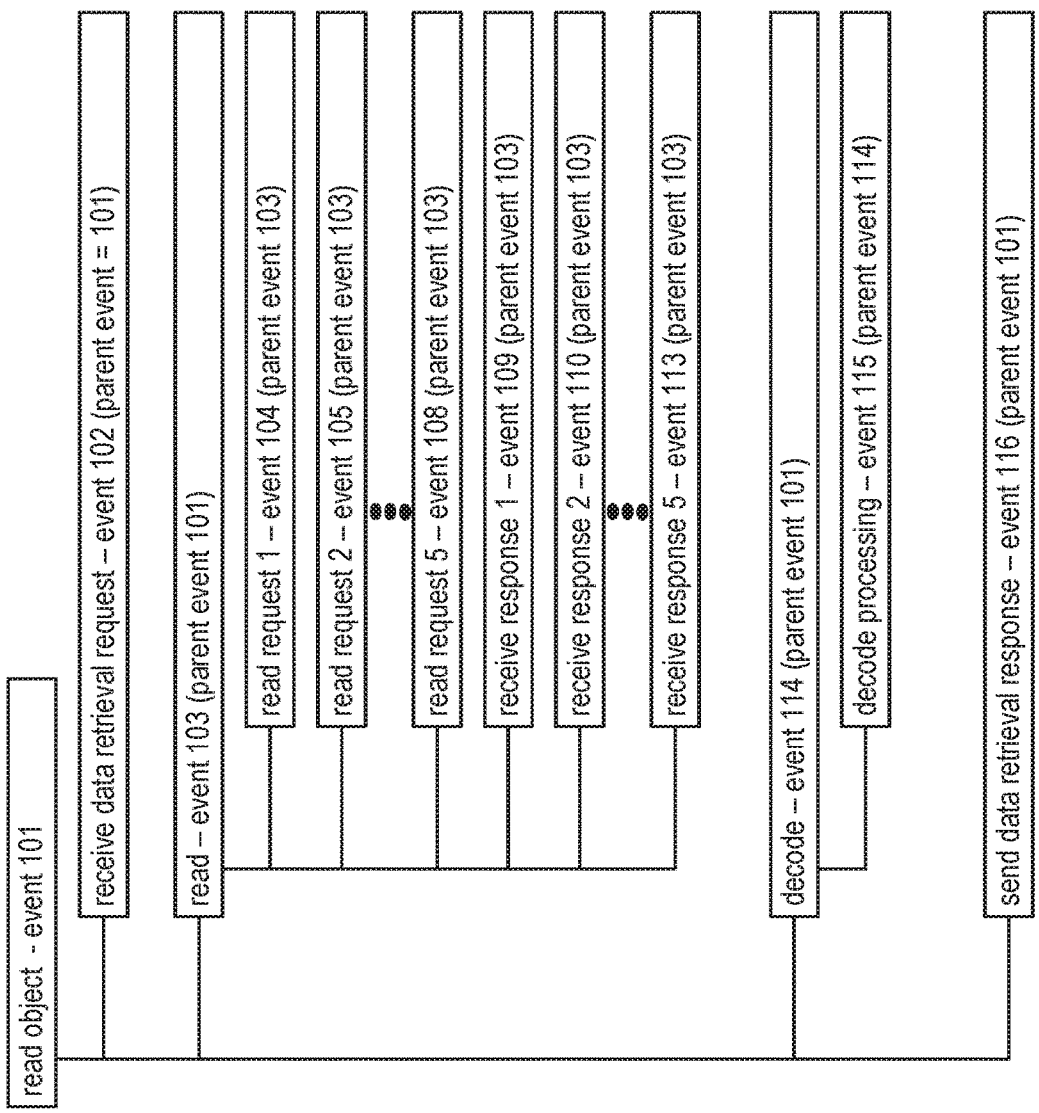
FIG. 11 is a diagram illustrating an example of a hierarchal event record representation in accordance with the invention.

FIG. 11 is a diagram illustrating an example 1100 of a hierarchal event record representation in accordance with the invention. This is a diagram illustrating an example of a hierarchal event record representation that includes a time sequential representation of an event. The time sequential representation includes one or more children events associated with the event. A child event of the one or more children events associated with the event is one layer removed from the event and is represented by one indentation from the event towards the right. A child event may include one or more children events (e.g., grandchildren) associated with the child event. A grandchild event of the child event is two layers removed from the event and is represented by two indentations from the event towards the right. A still further child event may be at any layer removed from the event.

The representation may include a plurality of event information records (e.g., one or more of an event record, a log record, a statistics record), wherein each event record includes at least an event identifier (ID) and a parent event ID when the event ID of the event record is associated with a child event. For example, a read object event associated with a dispersed storage (DS) processing unit is assigned event ID=101 and is associated with a plurality of children events including a received data retrieval request event ID=102, a read event ID=103, a decode event ID=114, and a send data retrieval response event ID=116. Each child event of the probably of children events is associated with parent event ID=101.

Children events may include children events. For example, the read event ID=103 includes read request 1-5 children events IDs=104-108 and read response 1-5 events IDs 109-113 when a response is received from five SUs. As another example, the read event ID=103 includes read request 1-5 children events IDs=104-108 and read response 1-3 events IDs 109-111 when a response is received from three of five SUs. A subsequent analysis of the representation indicates that two slices were not received when the received response event includes read responses 1-3 (e.g., missing responses 4-5). As another child of child event example, the decode event ID=114 includes a decode processing event ID=115. The read object event 101 finishes with the same data retrieval response event ID=116.

FIG. 12A is a flowchart illustrating an example of generating a log record in accordance with the invention. This is a flowchart illustrating an example of generating a log record. The method 1201 begins with a step 1210 where a processing module (e.g., a reporting entity processing module) detects a state change. The detection may be based on one or more of a software flag, a message, a predetermination, a process output, a pattern match, a valid state table, and a previous state condition. The method 1201 continues at the step 1220 where the processing module obtains a state descriptor. The obtaining may be based on one or more of the state change, lookup, generating a state descriptor, a state descriptor table lookup, retrieving the state descriptor, and receiving the state descriptor in response to sending a query. The method 1201 continues at the step 1230 where the processing module obtains a timestamp. The obtaining includes at least one of querying a time module, receiving the timestamp, and retrieving the timestamp.

The method 1201 continues at the step 1240 where the processing module obtains state parameters. The obtaining may be based on one or more of the state change, the state descriptor, the timestamp, a state parameters table lookup, retrieving state parameters, an error message, a parameter table lookup, a parameter history record lookup, and receiving a state parameter in response to sending a query. The method 1201 continues at the step 1250 where the processing module generates a log record entry. The generation includes aggregating the state change, the state descriptor, the timestamp, and the state parameters to produce entries for fields of the log record entry. The method 1201 continues at the step 1260 where the processing module facilitates storing the log record entry. The facilitation includes at least one of storing the log record entry locally and sending the log record entry to another system element (e.g., a dispersed storage (DS) managing unit) for storage.

FIG. 12B is a flowchart illustrating an example of generating a statistics record in accordance with the invention. This is a flowchart illustrating an example of generating a statistics record, that includes similar steps to FIG. 12A. The method 1202 begins with a step 1212 where a processing module (e.g., a reporting entity processing module) determines to create a statistics record entry. The determination may be based on one or more of an error message, a state change, a time period, an event, a software flag, a message, a predetermination, a process output, a pattern match, a previous state condition, a previous statistic, a statistical correlation output, and a request. For example, the processing module determines to create the statistics record entry when a slice storage error message is received.

The method 1202 continues at the step 1222 where the processing module obtains one or more quantitative descriptor types. The obtaining may be based on one or more of a lookup, a system condition, configuration information, a retrieval, a query, receiving, an error message, and a memory utilization indicator. For example, the processing module obtains one or more quantitative descriptor types from a table lookup based on the slice storage error message, wherein the one or more quantitative descriptor types includes available memory and memory device status.

The method 1202 continues at the step 1232 where the processing module obtains a quantitative descriptor value for each of the one or more quantitative descriptor types. The obtaining may be based on one or more of a query, receiving, an error message, a historical record lookup, another statistics record entry, and a value source indicator table lookup. For example, the processing module queries memory devices of a dispersed storage (DS) unit and receives memory device status and available memory information. The method 1202 continues with the step 1242 where the processing module obtains a timestamp and/or with the step 1230 of FIG. 12A where the processing module obtains a timestamp. The method 1202 continues at the step 1252 where the processing module generates a statistics record entry. The generation includes generating one or more entries of fields of the statistics record entry including a reporting entity identifier (ID), a step of a process and/or event, the timestamp, the one or more quantitative descriptor types, and one or more quantitative descriptor values corresponding to each of the one more quantitative descriptor types. The method 1202 continues at the step 1262 where the processing module facilitates storing the statistics record entry (e.g., storing locally or sending the statistics record entry).

FIG. 12C is a flowchart illustrating an example of correlating a statistics record and a log record in accordance with the invention. This is a flowchart illustrating an example of correlating a statistics record and a log record. The method 1203 begins with a step 1211 where a processing module (e.g., a reporting entity processing module, a dispersed storage (DS) managing unit) determines whether to create an error report. The determination may be based on one or more of a report time period expiration, an error message, a request, a predetermination, a software trigger, a state transition detection, and a quantified descriptor value compares unfavorably to a descriptor threshold. For example, the processing module determines to create the error report when a report time period has expired since generation of a previous error report and a store slice error message has been received. The method 1203 continues to the next step 1221 when the processing module determines whether to create the error report. In the next step 1231 when it has been determined to create the error report, the processing module correlates one or more statistics record entries with one or more log record entries to produce the error report. The correlation may be based on one more of similar timestamps, similar reporting identifiers (IDs), similar event IDs, records with similar parent IDs, and records associated with a similar level of a hierarchical representation of an event sequence.

This disclosure presents, among other things, improvements that provide means to determine the status of a data storage system. For example, log record entries (e.g., REL 2.4 Logs) indicate a sequence of qualitative system states, and statistics operate to indicate a sequence of quantitative states. A unified storage system is used for the collection, storage, and analysis of logs (e.g., log record entries) and statistic information generated by storage units (SUs) is a dispersed or distributed storage network (DSN). In some implementations of the generation of error reports, both log and statistic information may be combined to produce a fuller picture of the state of at least a portion of the DSN when an error may have occurred and a portion of the DSN may have failed. For example, a write request may fail because SU took too long to respond to a request as indicated by the logs. The statistics may be used to determine why this may have occurred, and perhaps the memory utilization was higher than normal, or the disk was under higher load than usual.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed or distributed storage network (DSN);
memory that stores operational instructions; and
a processing module operably coupled to the interface and to the memory, wherein the processing module, when operable within the computing device based on the operational instructions, is configured to:
receive, from a storage unit (SU) of the DSN, a signal via the interface, wherein the signal is in response to a read request from a user for an encoded data slice (EDS) of a set of encoded data slices (EDSs), wherein the SU includes a set of memory devices and the EDS is stored in a memory device of the set of memory devices;
based on the signal, detect a state change for the SU;
obtain a state descriptor;
obtain a timestamp;
obtain state parameters;
generate a log record entry based on aggregation of the state change, the state descriptor, the timestamp, and the state parameters; and
facilitate storage of the log record entry within event memory of the DSN.

2. The computing device of claim 1, wherein at least one:
detection of the state change is based on at least one of a software flag, a message, a predetermination, a process output, a pattern match, a valid state table, or a previous state condition;
obtaining the state descriptor is based on at least one of the state change, lookup, generating the state descriptor, a state descriptor table lookup, retrieving the state descriptor, or receiving the state descriptor in response to sending a query;
obtaining the timestamp is based on at least one of querying a time module, receiving the timestamp, or retrieving the timestamp; or
obtaining the state parameters is based on at least one of the state change, the state descriptor, the timestamp, a state parameters table lookup, retrieving the state parameters, an error message, a parameter table lookup, a parameter history record lookup, or receiving a state parameter in response to sending the query or another query; or
facilitating the storage of the log record entry within event memory of the DSN is based on at least one of storing the log record entry within locally within the memory or transmitting the log record entry to another computing device within the DSN.

3. The computing device of claim 1, wherein the processing module, when operable within the computing device based on the operational instructions, is further configured to:
determine to generate a statistics record;
obtain one or more quantitative descriptor types;
obtain a quantitative descriptor value for each of the one or more quantitative descriptor types;
obtain another timestamp;
generate a statistics record entry including to generate at least one of one or more entries of fields of the statistics record entry including a reporting entity identifier (ID), a step of at least one of a process or event, the another timestamp, the one or more quantitative descriptor types, or one or more quantitative descriptor values corresponding to each of the one more quantitative descriptor types; and
facilitate storage of the statistics record entry within event memory of the DSN.

4. The computing device of claim 3, wherein at least one:
determination to generate the statistics record is based on at least one of an error message, a state change, a time period, an event, a software flag, a message, a predetermination, a process output, a pattern match, a previous state condition, a previous statistic, a statistical correlation output, a request, or receipt of a slice storage error message;
obtaining the one or more descriptor types is based on at least one of a lookup, a system condition, configuration information, a retrieval, a query, receiving an error message, or a memory utilization indicator; or
obtaining the quantitative descriptor value for each of the one or more quantitative descriptor types is based on at least one of query, receiving an error message, a historical record lookup, another statistics record entry, or a value source indicator table lookup.

5. The computing device of claim 1, wherein:
a decode threshold number of EDSs are needed to recover the data segment;
a read threshold number of EDSs provides for reconstruction of the data segment;
a write threshold number of EDSs provides for a successful transfer of the set of EDSs from a first at least one location in the DSN to a second at least one location in the DSN;
the set of EDSs is of pillar width and includes a pillar number of EDSs;
each of the decode threshold number, the read threshold number, and the write threshold number is less than the pillar number; and
the write threshold number is greater than or equal to the read threshold number that is greater than or equal to the decode threshold number.

6. The computing device of claim 1, wherein the computing device is located at a first premises that is remotely located from a second premises of at least one SU of the plurality of SUs within the DSN.

7. The computing device of claim 1 further comprising:
a SU of the plurality of SUs within the DSN, a wireless smart phone, a laptop, a tablet, a personal computer (PC), a work station, or a video game device.

8. The computing device of claim 1, wherein the DSN includes at least one of a wireless communication system, a wire lined communication system, a non-public intranet system, a public internet system, a local area network (LAN), or a wide area network (WAN).

9. A computing device comprising:
an interface configured to interface and communicate with a dispersed or distributed storage network (DSN);
memory that stores operational instructions; and
a processing module operably coupled to the interface and to the memory, wherein the processing module, when operable within the computing device based on the operational instructions, is configured to:

receive, from a storage unit (SU) of the DSN, a signal via the interface, wherein the signal is in response to a read request from a user for an encoded data slice (EDS) of a set of encoded data slices (EDSs), wherein the SU includes a set of memory devices and the EDS is stored in a memory device of the set of memory devices;

based on the signal, detect a state change for the SU;

obtain a state descriptor based on at least one of the state change, lookup, generating the state descriptor, a state descriptor table lookup, retrieving the state descriptor, or receiving the state descriptor in response to sending a query;

obtain a timestamp based on at least one of querying a time module, receiving the timestamp, or retrieving the timestamp;

obtain state parameters based on at least one of the state change, the state descriptor, the timestamp, a state parameters table lookup, retrieving the state parameters, an error message, a parameter table lookup, a parameter history record lookup, or receiving a state parameter in response to sending the query or another query;

generate a log record entry based on aggregation of the state change, the state descriptor, the timestamp, and the state parameters; and facilitate storage of the log record entry within event memory of the DSN based on at least one of storing the log record entry within locally within the memory or transmitting the log record entry to another computing device within the DSN.

10. The computing device of claim 9, wherein the processing module, when operable within the computing device based on the operational instructions, is further configured to:

determine to generate a statistics record;

obtain one or more quantitative descriptor types;

obtain a quantitative descriptor value for each of the one or more quantitative descriptor types;

obtain another timestamp;

generate a statistics record entry including to generate at least one of one or more entries of fields of the statistics record entry including a reporting entity identifier (ID), a step of at least one of a process or event, the another timestamp, the one or more quantitative descriptor types, or one or more quantitative descriptor values corresponding to each of the one more quantitative descriptor types; and facilitate storage of the statistics record entry within event memory of the DSN.

11. The computing device of claim 10, wherein at least one:

determination to generate the statistics record is based on at least one of an error message, a state change, a time period, an event, a software flag, a message, a predetermination, a process output, a pattern match, a previous state condition, a previous statistic, a statistical correlation output, a request, or receipt of a slice storage error message;

obtaining the one or more descriptor types is based on at least one of a lookup, a system condition, configuration information, a retrieval, a query, receiving an error message, or a memory utilization indicator; or obtaining the quantitative descriptor value for each of the one or more quantitative descriptor types is based on at least one of query, receiving an error message, a historical record lookup, another statistics record entry, or a value source indicator table lookup.

12. The computing device of claim 9, wherein:

a decode threshold number of EDSs are needed to recover the data segment;

a read threshold number of EDSs provides for reconstruction of the data segment;

a write threshold number of EDSs provides for a successful transfer of the set of EDSs from a first at least one location in the DSN to a second at least one location in the DSN;

the set of EDSs is of pillar width and includes a pillar number of EDSs;

each of the decode threshold number, the read threshold number, and the write threshold number is less than the pillar number; and the write threshold number is greater than or equal to the read threshold number that is greater than or equal to the decode threshold number.

13. The computing device of claim 9 further comprising:

a SU of the plurality of SUs within the DSN, a wireless smart phone, a laptop, a tablet, a personal computer (PC), a work station, or a video game device; and wherein:

the DSN includes at least one of a wireless communication system, a wire lined communication system, a non-public intranet system, a public internet system, a local area network (LAN), or a wide area network (WAN).

14. A method for execution by a computing device, the method comprising:

receiving, from a storage unit (SU) of a dispersed or distributed storage network (DSN), a signal via an interface of the computing device that is configured to interface and communicate with the DSN, wherein the signal is in response to a read request from a user for an encoded data slice (EDS) of a set of encoded data slices (EDSs), wherein the SU includes a set of memory devices and the EDS is stored in a memory device of the set of memory devices;

based on the signal, detecting a state change for the SU;

obtaining a state descriptor;

obtaining a timestamp;

obtaining state parameters;

generating a log record entry based on aggregation of the state change, the state descriptor, the timestamp, and the state parameters; and facilitating storage of the log record entry within event memory of the DSN.

15. The method of claim 14, wherein at least one:

detection of the state change is based on at least one of a software flag, a message, a predetermination, a process output, a pattern match, a valid state table, or a previous state condition;

obtaining the state descriptor is based on at least one of the state change, lookup, generating the state descriptor, a state descriptor table lookup, retrieving the state descriptor, or receiving the state descriptor in response to sending a query;

obtaining the timestamp is based on at least one of querying a time module, receiving the timestamp, or retrieving the timestamp; or obtaining the state parameters is based on at least one of the state change, the state descriptor, the timestamp, a state parameters table lookup, retrieving the state parameters, an error message, a parameter table lookup, a parameter history record lookup, or receiving a state parameter in response to sending the query or another query; or facilitating the storage of the log record entry within event memory of the DSN is based on at least one of storing the log record entry within locally within the memory or transmitting the log record entry to another computing device within the DSN.

16. The method of claim 14 further comprising:
determining to generate a statistics record;
obtaining one or more quantitative descriptor types;
obtaining a quantitative descriptor value for each of the one or more quantitative descriptor types;
obtaining another timestamp;
generating a statistics record entry including to generate at least one of one or more entries of fields of the statistics record entry including a reporting entity identifier (ID), a step of at least one of a process or event, the another timestamp, the one or more quantitative descriptor types, or one or more quantitative descriptor values corresponding to each of the one more quantitative descriptor types; and
facilitating storage of the statistics record entry within event memory of the DSN.

17. The method of claim 16, wherein at least one:
determination to generate the statistics record is based on at least one of an error message, a state change, a time period, an event, a software flag, a message, a predetermination, a process output, a pattern match, a previous state condition, a previous statistic, a statistical correlation output, a request, or receipt of a slice storage error message;
obtaining the one or more descriptor types is based on at least one of a lookup, a system condition, configuration information, a retrieval, a query, receiving an error message, or a memory utilization indicator; or
obtaining the quantitative descriptor value for each of the one or more quantitative descriptor types is based on at least one of query, receiving an error message, a historical record lookup, another statistics record entry, or a value source indicator table lookup.

18. The method of claim 14, wherein:
a decode threshold number of EDSs are needed to recover the data segment;
a read threshold number of EDSs provides for reconstruction of the data segment;
a write threshold number of EDSs provides for a successful transfer of the set of EDSs from a first at least one location in the DSN to a second at least one location in the DSN;
the set of EDSs is of pillar width and includes a pillar number of EDSs;
each of the decode threshold number, the read threshold number, and the write threshold number is less than the pillar number; and
the write threshold number is greater than or equal to the read threshold number that is greater than or equal to the decode threshold number.

19. The method of claim 14, wherein the computing device includes a SU of the plurality of SUs within the DSN, a wireless smart phone, a laptop, a tablet, a personal computer (PC), a work station, or a video game device.

20. The method of claim 14, wherein the DSN includes at least one of a wireless communication system, a wire lined communication system, a non-public intranet system, a public internet system, a local area network (LAN), or a wide area network (WAN).

* * * * *